UNITED STATES PATENT OFFICE.

FRANK SIBLEY, JAMES HOLMWOOD, JR., AND AUGUST LUCKENBACH, OF BUFFALO, NEW YORK; SAID LUCKENBACH ASSIGNOR TO SAID SIBLEY AND HOLMWOOD, JR.

IMPROVEMENT IN CONFECTIONERY COMPOSITION.

Specification forming part of Letters Patent No. 193,045, dated July 10, 1877; application filed May 1, 1877.

*To all whom it may concern:*

Be it known that we, FRANK SIBLEY, JAMES HOLMWOOD, Jr., and AUGUST LUCKENBACH, all of the city of Buffalo, in the county of Erie and State of New York, have invented a certain new and useful Confectionery Compound, which is fully described in the following specification.

Our invention consists of a combined chewing-gum and caramel or candy, composed of paraffine, coffee-sugar, and grape-sugar or glucose.

In preparing our combined chewing-gum and candy, we take, by weight, one part of paraffine, three parts of coffee-sugar, (preferably confectioners' "A" sugar,) and six parts of grape-sugar or glucose, adding any desired flavoring and coloring matters. These ingredients are intimately combined by boiling or cooking them together for a certain length of time until the mass is cooked to "crack." The compound is then cooled, pulled, rolled out, and cut up into pieces of any desired form or size, in an ordinary manner. Each piece is finally wrapped up in paraffine paper, when the compound is ready for market.

The ingredients may be employed in different proportions from those above stated; but we find that those proportions give the best results.

Our improved compound possesses the chewing qualities of ordinary gum, and at the same time the pleasant taste of candy or caramels, which remains in the compound while it is consumed for a comparatively great length of time, owing to the intimate combination of the ingredients.

Having thus fully described our invention, what we claim as new, and desire to secure by Letters Patent, is—

A composition consisting of paraffine, coffee-sugar, and grape-sugar or glucose, substantially as and for the purpose hereinbefore set forth.

FRANK SIBLEY.
J. HOLMWOOD, JR.
AUGUST LUCKENBACH.

Witnesses:
EDWARD WILHELM,
GEORGE H. SYKES.